United States Patent [19]

Luo et al.

[11] Patent Number: 4,956,458
[45] Date of Patent: Sep. 11, 1990

[54] PURIFICATION OF POLYDEXTROSE BY REVERSE OSMOSIS

[75] Inventors: Shiuh J. Luo, Morris Plains; Frank J. Bunick, Budd Lake; Robert H. Graf, Randolph, all of N.J.

[73] Assignee: Warner-Lambert Company, Morris Plains, N.J.

[21] Appl. No.: 193,961

[22] Filed: May 13, 1988

[51] Int. Cl.$^5$ .......................... C08B 37/02; C07H 1/06; C07H 1/08

[52] U.S. Cl. ..................................... 536/112; 536/127

[58] Field of Search .............................. 536/112, 127

[56] References Cited

U.S. PATENT DOCUMENTS

| | | | |
|---|---|---|---|
| 2,876,104 | 3/1959 | Bliudsius et al. | 426/548 |
| 2,876,105 | 3/1959 | Jucaitis et al. | 426/548 |
| 2,876,106 | 3/1959 | Jucaitis et al. | 426/548 |
| 2,876,107 | 3/1959 | Jucaitis et al. | 426/548 |
| 3,544,455 | 12/1979 | Adams, Jr. et al. | 562/593 |
| 3,766,165 | 10/1973 | Rennhard | 536/1.1 |
| 3,868,465 | 2/1975 | Furda et al. | 426/576 |
| 3,874,924 | 4/1975 | Sands et al. | 426/214 |
| 3,876,794 | 4/1975 | Rennhard | 426/214 |
| 3,971,857 | 7/1976 | Fruda et al. | 426/212 |
| 4,024,290 | 5/1977 | Layton | 426/548 |
| 4,042,714 | 8/1977 | Torres | 426/62 |
| 4,206,049 | 6/1980 | Stana et al. | 210/22 R |
| 4,366,308 | 12/1982 | Soma et al. | 536/128 |
| 4,382,963 | 5/1983 | Klose et al. | 426/3 |
| 4,528,206 | 7/1985 | Kastin | 426/660 |
| 4,597,981 | 7/1986 | Kastin | 426/660 |
| 4,601,829 | 7/1986 | Kaneko et al. | 210/638 |
| 4,622,233 | 11/1986 | Torres | 426/548 |
| 4,892,938 | 1/1990 | Giovanetto | 536/127 |
| 4,906,746 | 3/1990 | Barnier et al. | 536/127 |

FOREIGN PATENT DOCUMENTS 892701 7/1982 Belgium.
61-254148 5/1985 Japan.

OTHER PUBLICATIONS

Spatz, D. D. and Trauberman, L., "How Membranes Separate Profits from Pollution", Reprinted from *Food Engineering* (Oct. 1975).
Spatz, D. D., "Reverse Osmosis/Ultrafiltration Application to Water Reuse and Material Reclamation", pp. 1–9 (May 1975).
Polydextrose Research Product Bulletin, Pfizer Central Research.
Smiles, R. E., "The Functional Applications of Polydextrose", *Chemistry of Foods and Beverages: Recent Developments*, p. 305–322 (1982).
Spatz, D. D., "Electroplating Waste Water Processing with Reverse Osmosis", Reprinted from *Products Finishing Magazine* by Osmonics, Inc.
Gregor, H. P. and Gregor, C. D., "Synthetic-Membrane Technology", *Scientific American*, 239, pp. 112–128 (Jul. 1978).
Haralson, R. N. and Jonhahl, K. E., "Ultafiltration Aids in Production of High Quality Water for Electronics Manufacture, A Case History" Reprinted from the *Proceedings of the 44th International Water Conference*, Pittsburgh, Pa. (Oct. 1983).
Bemberis, I. and Neely, K., "Ultrafiltration as a Competitive Unit Process", Reprinted from *CEP-Chemical Engineering Progress* (Nov. 1986).
Bottino, A. etal., "Ultrafiltration of Hydrosoluble Polymers. Effect of Operating Conditions on the Performance of the Membrane", *Journal of Membrane Science*, 21, pp. 247–267 (1984).
Gravatt, D. P. and Molnar, T. E., "Recovery of an Extracellular Antibiotic by Ultrafiltration", *Membrane Separations in Biotechnology*, c. 4, p. 89–97 (1986).

*Primary Examiner*—Nathan M. Nutter
*Attorney, Agent, or Firm*—Craig M. Bell

[57] ABSTRACT

The present invention is a process for purifying polydextrose to remove manufacturing contaminants such as glucose, sorbitol, citric acid, oligomers, 1,6-anhydroglucose, 5-hydroxymethylfurfural and other low molecular weight constituents by reverse osmosis wherein an aqueous solution of polydextrose is filtered by pressing it tangentially over a porous membrane at high pressure. This invention process produces a purified polydextrose with the 1,6-anhydroglucose content therein reduced to less than about 0.2% (W/W) and a reduction in the 5-hydroxymethylfurfural content to below detectable levels or loss than about 0.01% (W/W), thereby virtually eliminating any bitter taste or musty off-flavor.

13 Claims, 1 Drawing Sheet

PURIFICATION OF POLYDEXTROSE BY REVERSE OSMOSIS

FIELD OF THE INVENTION

This invention relates to a process for purifying polydextrose to remove most of the off-flavor constituents such as anhydroglucose and furaldehyde derivatives to provide an organoleptically acceptable purified polydextrose. More particularly, this invention provides a process purifying polydextrose by reverse osmosis. The purified polydextrose prepared in accordance with this inventive method contains less than about 0.2% (W/W) 1,6-anhydroglucose and the 5-hydroxymethylfurfural content is reduced to below detectable levels or less than about 0.01% (W/W).

BACKGROUND OF THE INVENTION

Polydextrose is a water-soluble, low calorie non-cariogenic bulking agent. It is a randomly cross-linked glucan polymer produced through the acid-catalyzed condensation of glucose. Rennhard U.S. Pat. No. 3,766,165 and Rennhard U.S. Pat. No. 3,876,794 detail the preparation of polymeric glucose and maltose products by anhydrous melt polymerization using non-volatile, edible, organic polycarboxylic acids as catalysts, cross-linking agents or polymerization activators.

Polydextrose is an essentially non-nutritive carbohydrate (approximately 1 calorie/gram) substitute. It provides a substitute for sugar and has many of the desired technological properties of sugar, but does not have the sweetness. This non-sweet bulking capability is advantageous where conventional sugar-based compositions have proven to be too sweet. Moreover, this non-sweet bulking capability is especially advantageous when used in combination with high intensity sweeteners to provide low-calorie food products having the desirable texture of conventional sugar-containing food products without the calories associated with the sugar.

Polydextrose is commercially available in three forms, Polydextrose A, an amorphous, slightly acid fusible powder, Polydextrose N, a neutralized, light-colored 70% solution of Polydextrose A, and Polydextrose K, a neutralized powder form of Polydextrose A. As the polymerization process produces a mixture of polysaccharides and saccharide residuals, none of these products is a pure polydextrose product. All of these polydextrose products include a variety of low molecular weight compounds, such as glucose, sorbitol, citric acid and oligomers, which contribute to the calorie value of these products. In addition, all of the polydextrose products also include other low molecular weight compounds such as 1,6-anhydroglucose (levoglucosan) and 5-hydroxymethylfurfural which give these products a bitter taste and musty off-flavor. Although these low molecular weight compounds are found in polydextrose products only in small amounts (1,6-anhydroglucose, about 4%, bitter taste) (5-hydroxymethylfurfural, about 0.1%, musty off-flavor), those amounts are significant enough to negatively impact on the usefulness of polydextrose in most food products when polydextrose is present in medium to high levels.

Torres U.S. Pat. No. 4,622,233 discloses a first method of treating polydextrose by decolorizing with a bleaching agent and thereafter purifying the decolorized material. A further method disclosed and claimed in the Torres '233 disclosure for reducing color, glucose content and anhydroglucose content of Type A polydextrose includes the following steps: (a) contacting a 60–70% (W/W) aqueous solution of polydextrose Type A with a food-approved bleaching agent at a temperature of 25°–90° C. and a pH of about 2.5 to about 9.0; (b) adjusting the pH of the product of step (a), if about 7, to about 6; (c) adding one or more of the solvents selected from the group consisting of methanol, ethanol and ethylacetate such that said solvent includes 50–80% (W/W) of the mixture; and (d) filtering the final product, and, if desired, drying. The Torres '233 patent ties decoloration to purification which is not n Moreover, decoloration can be an undesired process requirement and condition which produces its own additional problems. For example, when the polydextrose purified by the Torres '233 method is subjected to high heating, such as in cooking, the coloring returns to the substance. In addition, the bleaching step leaves residuals which are difficult to remove. Furthermore, extra steps are required by Torres which require additional time, handing, and energy.

U.S. patent application Ser. No. 043,793, filed Apr. 29, 1987, entitled "Method of Purifying Polydextrose and Composition Containing Same" and assigned to Warner-Lambert Company, assignee of the present application, discloses a process for providing a purified, unbleached polydextrose product wherein an aqueous solution of polydextrose in a concentration of from about 10% to about 90% is intimately contacted with a polar organic solvent such as ethanol or acetone. The ratio of polydextrose to solvent is from about 5% to about 4 by weight of polydextrose to about 35% to about 85% by weight of solvent. The mixture is then allowed to equilibrate to form a substantially contaminantcontaining fraction and a substantially polydextrosecontaining fraction. The fractions are then separated for use of the polydextrose-containing fraction.

Generally, osmosis refers to a process whereby a pure liquid (usually water) passes through a semipermeable membrane into a solution (usually sugar or salt and water) to dilute the solution and achieve osmotic equilibrium between the two liquids. In contrast, reverse osmosis is a pressure driven membrane process wherein the application of external pressure to the membrane system results in a reverse flux with the water molecules passing from a saline or sugar solution compartment into the pure water compartment of the membrane system. Reverse osmosis membranes also allow a variety of aqueous solutes to pass through them while retaining selected molecules. It is a method of removing dissolved components of a material without a phase change. This is advantageous in that reverse osmosis purification presents a substantial energy savings over conventional steam distillation or other vaporization techniques. It is especially advantageous where heat labile and/or volatile desirable components to be retained are present.

Reverse osmosis membranes are very thin semipermeable membranes characterized in their composition, molecular weight cut-off (MWCO), and rejection properties, that is, their total capacity to retain specific molecules while allowing the solute and other, generally smaller or opposite charged molecules, to pass through. The idea in selecting a reverse osmosis membrane is to optimize the permeability, MWCO, and rejection characteristics for a particular application.

Reverse osmosis has been used for water purification including salt removal for potable water or water for injection. It is now being applied to concentration and purification of low molecular weight pharmaceutical products, such as antibiotics, peptides and amino acids.

Adams et al., U.S. Pat. No. 3,544,455 discloses a process for purifying aqueous solutions of itaconic acid of inorganic salts, colored matter and organic impurities by use of reverse osmosis. Pressure is applied to the solution and a semipermeable membrane which allows passage of the itaconic acid and water, but not the impurities, is utilized. Stana et al. U.S. Pat. No. 4,206,049. discloses a method for concentrating and recovering uranium from a phosphoric acid solution using a reverse osmosis membrane system, a means for iron precipitation and removal, and subsequent evaporation and ignition of organic impurities. Kaneko et al. U.S. Pat. No. 4,601,829 discloses a process for purifying lysine including separating lysine from aqueous ammonia by use of a cation exchange resin, a reverse osmosis membrane system and a means for. concentrating the liquids such that removal of ammonia is achieved.

It has now been found that polydextrose can be purified by reverse osmosis techniques to remove greater amounts of 1,6-anhydroglucose, 5--hydroxymethylfurfural and other low molecular weight manufacturing contaminants to provide an organoleptically improved polydextrose. The reverse osmosis technique allows for removal of greater amounts of impurities in a short processing time without use of organic solvents. A high yield is achieved at a low cost. This new product, polydextrose purified by reverse osmosis, containing greatly reduced amounts of manufacturing contaminants such as 1,6anydroglucose and 5-hydroxymethylfurfural, can be utilized in products for oral ingestion such as food products in much greater concentrations, even as high as about 99%, without any bitter taste or musty off-flavor and without the need to use masking agents to disguise the unpleasant taste qualities. Accordingly, this new improved polydextrose would have great utility as a low calorie non-sweet bulking agent in many products for oral ingestion including food products, and especially confections.

SUMMARY OF THE INVENTION

The present invention is a process for purifying polydextrose to remove manufacturing contaminants such as glucose, sorbitol, citric acid, oligomers, 1,6-anhydroglucose, 5-hydroxymethylfurfural and other low molecular weight constituents by reverse osmosis. More particularly, this unique process for purifying polydextrose includes processing polydextrose using modified reverse osmotic techniques. In essence, an aqueous solution of polydextrose is filtered by pressing it tangentially over a porous membrane at high pressure. In a preferred embodiment, reverse osmosis with a spiral wound 1000 MWCO cellulose acetate membrane (PCAC - Millipore) at pressures of from about 50 to about 500 psi provides a high polydextrose yield after a short processing time with the 1,6-anhydroglucose content therein reduced to less than about 0.2% (W/W) reduction in the 5-hydroxymethylfurfural content to below detectable levels or less than about 0.01% (W/W). detectable levels or less Membranes of varying composition, MWCO and rejection properties may, of course, be utilized with a concurrent modification in the pressure applied thereto. Applicants' inventive process produces a purified polydextrose without any bitter taste or musty off-flavor which renders this purified polydextrose useable in products for oral ingestion hot heretofore possible and in amounts not heretofore possible.

DETAILED DESCRIPTION OF THE INVENTION

Figure 1:
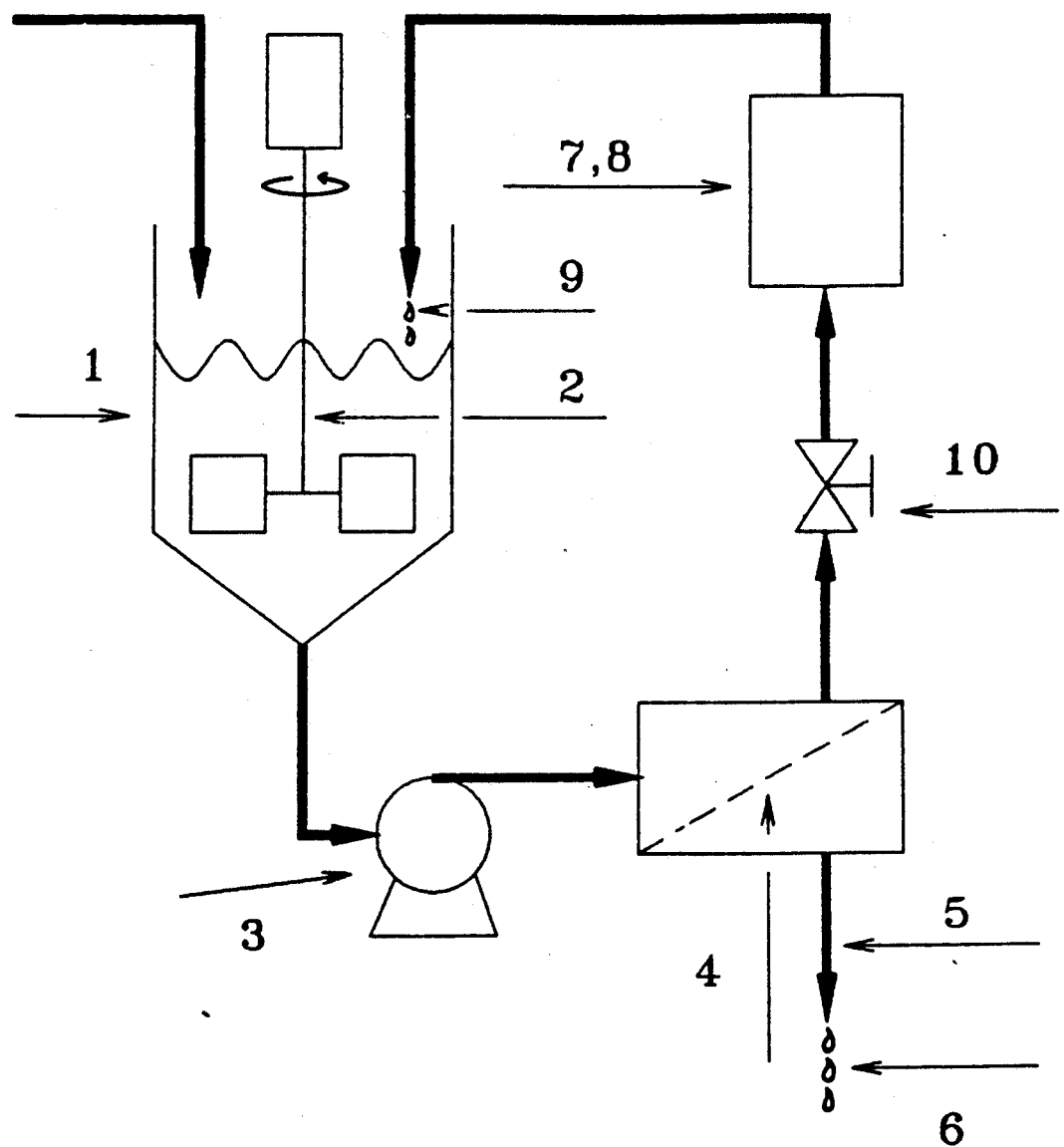
FIG. 1 depicts a flow diagram for the process of this invention.

This invention is a process for purification of polydextrose to a form in which it is highly palatable without a bitter taste or musty off-flavor, and hence, very useful as a low calorie bulking agent for products for oral ingestion including food products, and especially confections. This process provides many advantages including: (a) more complete removal of 1,6-anhydroglucose and 5-hydroxymethylfurfural impurities which, when present, cause a bitter taste and musty offwhich, flavor; (b) more complete removal of low molecular weight components such as glucose, sorbitol, citric acid and oligomers which, when present, contribute to the calorie content of the composition; (c) high polydextrose recovery of about 70% to about 90% or higher; (d) short processing time; (e) low cost processing; (f) no need for organic solvents; and, (g) concentration of the polydextrose.

The general procedure in accordance with the present invention includes processing an aqueous solution of polydextrose through a reverse osmosis system under pressure for sufficient time to reduce the 1,6-anhydroglucose and 5-hydroxymethylfurfural content to an amount which does not adversely effect the taste of the polydextrose product.

Referring now to FIG. 1, the reverse osmosis system includes a feed tank 1 having a agitation means 2 for stirring the aqueous polydextrose solution charged into the feed tank, a pump 3 which applies pressure and pumps the aqueous polydextrose solution along a reverse osmosis membrane 4, a means 5 for removing the permeate 6 and a means for continuous flow 7 and/or batch 8 recycling of the retentate 9 including a back pressure valve 10.

The agitation means 2 can be any conventional stirring or agitating apparatus.

The pump 3 which applies pressure to and pumps the aqueous polydextrose solution can be any conventional pump which is capable of supplying the charge pressure, including a diaphragm pump. The pressure applied to the aqueous polydextrose solution while it is passing through the reverse osmosis membrane can range from about 50 to about 500 psi with a 1000 MWCO (PCAC - Millipore) cellulose acetate membrane. Preferably, the pressure should be in the range of about 150 to about 400 psi with a 1000 MWCO (PCAC - Millipore) cellulose acetate membrane. Most preferably, the pressure should be in the range of about 200 to about 300 psi with a 1000 MWCO (PCAC - Millipore) cellulose acetate membrane. Other MWCO membranes of varying constituents, such as a 400 MWCO (NF - Millipore), or smaller may, of course, be utilized with a concurrent increase in the pressure applied up to about 1,000 psi.

The reverse osmosis membrane 4 can be any one of the conventional reverse osmosis membranes. The membrane may be flat, tubular, spiral, hollow fiber, and the like. It may be constructed from cellulose derivatives including cellulose acetate as well as polyamide, fluorocarbon, polysulfone, and the like. A preferred membrane is cellulose acetate film with submicroscopic pores in its surface which can range from 0.0005 to 0.002 micron. The reverse osmosis membrane may have a retention characteristic of from about 40% to about 1.00%, preferably from about 70% to about 1.00%. The nominal average molecular weight limit of the membranes may be from about 200 to about 3000. Of course, the particular reverse osmosis membrane chosen to be utilized must be capable of withstanding the necessary pressure.

The means 5 for removing the permeate 6 can be any conventional device which allows gravity-driven or other means for removal to occur.

The means for continuous flow 7 and/or batch 8 recycling can be any conventional combination of pumps, valves, tanks, tubing, and the like which are designed to bring the liquid from the membrane area back to the feed tank for further cycling.

The polydextrose starting material can be either Type A, Type N or Type K. An aqueous solution with a polydextrose concentration of from about to about 80% (W/W), preferably from about 10% to about 70% (W/W) is prepared. This solution is then charged into the feed tank of the reverse osmosis system. Pressure is applied and the material is passed through the reverse osmosis membrane. The permeate consists of low molecular weight compounds such as water, glucose, sorbitol, citric acid, oligomers, 1–6 anhydroglucose, 5-hydroxymethylfurfural and the like. The retentate consists of partially purified polydextrose. The retentate is recycled into the feed tank and additional diafiltration wash may be added. The polydextrose feed solution is passed through the membrane under pressure for sufficient time to remove virtually all of the contaminants. The final polydextrose retentate product contains less than about 0.2% (W/W) = 1-6-anhydroglucose and less than about 0.01% (W/W) 5-hydroxymethylfurfural. It may be concentrated by The following Examples serve to provide further appreciation of the invention but are not meant in any way to restrict the effective scope of the invention. All percents are by weight of the total composition unless otherwise specified.

EXAMPLE 1

Purification and Concentration of Polydextrose by Reverse Osmosis

A purified polydextrose product was prepared in accordance with the process of the present invention. The initial conditions, run conditions and final conditions are set forth in Table I.

An aqueous polydextrose solution was prepared by dissolving 300 grams of polydextrose A in 27.00 grams of deionized water. This aqueous solution was charged into the feed tank. The reverse osmosis system was set to operate in the continuous flow recycling manner. The diaphragm pump was started and the back flow valve was slowly turned off to allow the pressure within the reverse osmosis system to build to about 250 psi. The aqueous polydextrose solution began to cycle through the system and removal of the permeate began. Occasional adjustment of the back flow valve was necessary to maintain the pressure within the system at 250 psi. The system was run to an aqueous partially polydextrose feed solution volume of approximately 1000 ml in the feed tank (0x diafiltration wash). The first diafiltration wash (deionized water) was added to the aqueous partially purified polydextrose solution in the feed tank in an amount of 4000% ml. The reverse osmosis system was again run to an aqueous partially purified polydextrose feed solution volume of approximately 1000 ml for completion of the first (1.33×) diafiltration wash. Then the second diafiltration wash (deionized water) was added to the aqueous partially purified polydextrose feed solution in an amount of 4000 ml. The reverse osmosis system was again run to an aqueous partially purified polydextrose feed solution volume of 1000 ml in the feed tank for completion of the second (2.66×) diafiltration wash. The third diafiltration wash (deionized water) was added to the aqueous partially purified polydextrose feed solution in an amount of 4000 ml. The reverse osmosis system was again run to an aqueous purified polydextrose solution volume of approximately 1000 ml in the feed tank for completion of the third (4x) diafiltration wash.

The concentration of purified polydextrose in the final 1000 ml volume of solution (retentate) was about 30%. The retentate was then concentrated by vacuum drying to a concentration of about 75%. The pH of the rentetate can be adjusted using NaOH, KOH and the like to provide a suitable purified polydextrose product.

TABLE 1

| Initial Conditions | |
|---|---|
| initial volume | approximately 3000 ml |
| polydextrose concentration | 10% |
| anhydroglucose concentration | 3% |
| Run Conditions | |
| temperature | room temp. |
| membrane-cellulose acetate | 3 ft$^2$ |
| transmembrane pressure | 250 psi |
| concentration[1] | 3X |
| diafiltration, wash volume[2] | 0X, 1.33X 2.66X, 4X |
| total run time | approximately 30 min/wash |
| Final Conditions | |
| final volume | 1 liter |
| polydextrose concentration | about 30% |

[1]Three-fold concentration. The original volume was reduced to one-third.
[2]No wash, 1.33-fold, 2.66-fold, and 4-fold of original volume of deionized water were added.

EXAMPLE 2

Polydextrose products were also prepared by alcohol preciitation and dialysis to obtain comparative data as to the anhydroglucose and monosaccharide content therein.

[1] Three-fold concentration. The original volume was reduced to one-third.
[2] No wash, 1.33-fold, 2.66-fold, and 4fold of original volume of deionized water were added.

Alcohol Precipitated Polydextrose

Polydextrose A (Pfizer) was purified by the alcohol precipitation method. A 10:70:20 W/W preparation of polydextrose A, 100% alcohol (USI, punctilious grade), and water was mixed in a container until an emulsion was formed. The mixture was allowed to stand at room temperature overnight (over 10 hours). The supernatant was discarded. The precipitate was collected and concentrated to a 75% solution.

Dialyzed Polydextrose

A 10% (W/W) solution of polydextrose A was adjusted then placed into a 12,000–14,000 MWCO, Spectra/Por 2 dialysis membrane tubing (Spectrum Scientific Co.) and sealed by tubing clips (Fisher Scientific Co.). The loaded tubing was suspended in a large suction flask and stir-dialyzed overnight (over 18 hours). The retentate (approximately 5%) was collected and vacuum concentrated to a 75% solution.

The various "purified" polydextrose samples were then analyzed by high phase liquid chromatography (HPLC). The samples were diluted then injected into a HPLC equipped with a DuPont $NH_2$ column. The mobile phase was 70% acetonitril and 30% water. The detector was the reflective index and the running time was 30 minutes. Table 2 sets forth the concentration of anhydroglucose and monosaccharide in the various samples.

| Method | Anhydro-glucose (%) | Mono-saccharide (%) | Yield (%) |
|---|---|---|---|
| reverse osmosis diafiltration | | | |
| 0X | 1.1 | 3.5 | 94 |
| 1.33X | 0.2 | 1.4 | 84 |
| 2.66X | BDL | BDL | 80 |
| 4X | BDL | BDL | 74 |
| alcohol precipitated polydextrose | 0.5 | 2.5 | 55 |
| dialyzed polydextrose | 0.3 | 3.6 | 50 |
| unpurified polydextrose A (Control) (Pfizer) | 2.9 | 6.1 | — |

BDL = Below Detectable Level by HPLC.

EXAMPLE 3

Sensory Evaluation of Purified Polydextrose Prepared by Reverse Osmosis

A 12-person sensory panel evaluated both the unpurified and purified polydextrose prepared by reverse osmosis. Eleven people could distinguish unpurified polydextrose from the purified 1.33, 2.66, and 4X reverse osmosis diafiltrates. The latter were significantly much more preferred than the former. The 1.33X, 2.66X and 4X reverse osmosis diafilterated polydextrose has a anhydroglucose content of less than about 0.2% (W/W) which gave a better quality than the dialyzed polydextrose (0.3% (W/W)) and alcohol precipitated polydextrose (0.5% (W/W)).

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

We claim:

1. A purified polydextrose product, which comprises: a commercially available polydextrose purified by pressing an aqueous solution of said polydextrose along a reverse osmosis system to remove manufacturing impurities (permeate) from the commercially available polydextrose and collecting the purified polydextrose solution (retentate).

2. A purified polydextrose product, which comprises a commercially available polydextrose purified by pressing an aqueous solution of said polydextrose along a reverse osmosis system to provide a purified polydextrose solution and recycling said purified polydextrose solution (retentate) to provide a purified polydextrose solution containing less than about 0.2% 1,6-anhydroglucose and less than about 0.01% hydroxymethylfurfural.

3. The purified polydextrose product of claim 2, wherein the concentration of polydextrose in the aqueous polydextrose solution is from about 1% to about 80%.

4. The purified polydextrose product of claim 3, wherein the concentration is from about 10% to about 70%.

5. The purified polydextrose product of claim 2, wherein the reverse osmosis system contains a reverse osmosis membrane which has a mean retention characteristic of from about 40% to about 100%.

6. The purified polydextrose product of claim 5, wherein the reverse osmosis membrane has a mean retention characteristic of from about 70% to about 100%.

7. The purified polydextrose product of claim 2, wherein the reverse osmosis system is operated under pressure up to 1000 psi.

8. The purified polydextrose product of claim 7, wherein the pressure is in the range of from about 50 to about 500 psi.

9. The purified polydextrose product of claim 8, wherein the pressure is in the range of from about 150 to about 400 psi.

10. The purified polydextrose product of claim 2, wherein the recycling step is operated in a continuous manner.

11. The purified polydextrose product of claim 2, recycling step is operated in a batch manner.

12. The purified polydextrose product of claim 2, wherein the reverse osmosis membrane used in the reverse osmosis system is selected from the group consisting of cellulose derivatives, polyamide, fluorocarbon, and polysulfone.

13. The purified polydextrose product of claim 2, wherein the additional step of concentrating the purified polydextrose solution is included.

* * * * *